(12) United States Patent
Leu et al.

(10) Patent No.: US 8,259,469 B2
(45) Date of Patent: Sep. 4, 2012

(54) CURRENT RIPPLE REDUCTION POWER CONVERSION CIRCUITS

(75) Inventors: Ching-Shan Leu, Taipei (TW); Pin-Yu Huang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 263 days.

(21) Appl. No.: 12/870,867

(22) Filed: Aug. 30, 2010

(65) Prior Publication Data

US 2012/0051108 A1 Mar. 1, 2012

(51) Int. Cl.
*H02M 3/335* (2006.01)

(52) U.S. Cl. ........... 363/20; 363/15; 363/16; 363/21.01; 363/21.04; 363/97

(58) Field of Classification Search ............ 363/15, 363/16, 20, 21.01, 21.08, 21.09, 56.01, 56.09, 363/56.1, 56.11, 97, 131
See application file for complete search history.

(56) References Cited

U.S. PATENT DOCUMENTS

| | | | | |
|---|---|---|---|---|
| 5,523,936 A | * | 6/1996 | Leu et al. | 363/21.04 |
| 5,640,318 A | * | 6/1997 | Leu | 363/131 |
| 5,774,345 A | * | 6/1998 | Yoshida et al. | 363/17 |
| 5,883,793 A | * | 3/1999 | Farrington | 363/16 |
| 5,907,479 A | * | 5/1999 | Leu | 363/16 |
| 6,005,779 A | * | 12/1999 | Cohen | 363/16 |
| 6,239,989 B1 | * | 5/2001 | Ming-Ching | 363/20 |
| 6,487,094 B1 | * | 11/2002 | Weng et al. | 363/21.12 |
| 6,927,987 B2 | * | 8/2005 | Farrington et al. | 363/56.02 |
| 6,961,254 B2 | * | 11/2005 | Tamura | 363/89 |
| 7,515,439 B2 | * | 4/2009 | Leu | 363/16 |
| 7,551,459 B1 | * | 6/2009 | Wittenbreder, Jr. | 363/21.06 |
| 7,957,161 B2 | * | 6/2011 | Leu | 363/21.03 |

* cited by examiner

*Primary Examiner* — Bao Q Vu

(74) *Attorney, Agent, or Firm* — Bacon & Thomas, PLLC

(57) ABSTRACT

A circuit used to convert DC input to AC output comprises a transformer and three series sub-circuits. The first series sub-circuit is connected in parallel with the DC input and comprises first and second capacitors connected in series. The secondary series sub-circuit is connected in parallel with the DC input and comprises a first primary winding of the transformer, a clamping capacitor and a second primary winding of the transformer sequentially connected in series. The third series sub-circuit connected in parallel with said clamping capacitor and comprises first and second switches connected in series. The center nodes of the first and third series sub-circuits are connected together. Thus, while a secondary winding of the transformer provides AC voltage, the circuit is able to effectively reduce current ripple and decrease voltage stress on semiconductor switch with minimum component count. Similar topologies may be used for rectification instead of inversion.

8 Claims, 8 Drawing Sheets

US 8,259,469 B2

CURRENT RIPPLE REDUCTION POWER CONVERSION CIRCUITS

FIELD OF THE INVENTION

The present invention is related to power conversion circuits which are able to effectively reduce current ripple and decrease voltage stress on semiconductor switch with minimum component count. Similar topologies may be used for rectification instead of inversion.

BACKGROUND OF THE INVENTION

The inversion function is to convert a DC voltage to an AC voltage for the electrical devices. As shown in FIG. 1, the half-bridge circuit is one of an inversion example among several other prior art circuit topologies. A DC input voltage Vin provides a DC input current and is connected in parallel with a series connection of capacitors C1 and C2 and a series connection of switches Q1 and Q2, respectively. A transformer T1 has a primary winding P1 connected between center nodes of the two series-connected capacitors and switches. Alternative operation of the switches Q1 and Q2 results in the generation of an AC output voltage on a secondary winding S1 of the transformer T1.

Because only one-half of the input voltage Vin is applied to the primary winding P1 of the transformer T1, the half-bridge topology has twice the current ripple on the primary winding P1 resulting in generating higher electromagnetic intensity (EMI) than that of the push-pull and full-bridge topologies.

Accordingly, the present invention is directed toward inversion circuits and corresponding rectification circuits which reduce the current ripple in the prior art topology.

SUMMARY OF THE INVENTION

An object of the present invention is to provide a switching mode power converter having an inversion or rectification circuit for reducing current ripple.

Another object of the present invention is to provide a switching mode power converter having an inversion or rectification circuit with leakage inductance and capacitor being a lossless snubber for recycling the leakage energy. Consequently, the converter's efficiency can be improved.

A further object of the present invention is to provide a switching mode power converter having an inversion or rectification circuit with two low voltage rating semiconductor switches connected in series to reduce the conduction losses. Consequently, further efficiency improvements can be improved.

Other objects, advantages, and novel features of the invention will become more apparent from the following detailed description when taken in conjunction with the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

Figure 1:
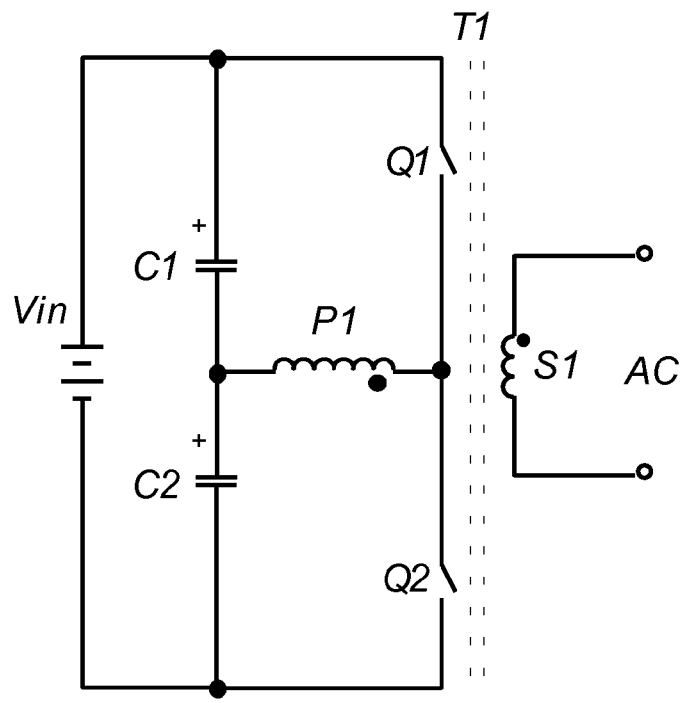
FIG. 1 is the circuit diagram of the half-bridge power converter as a prior art of the present invention.
Figure 2:
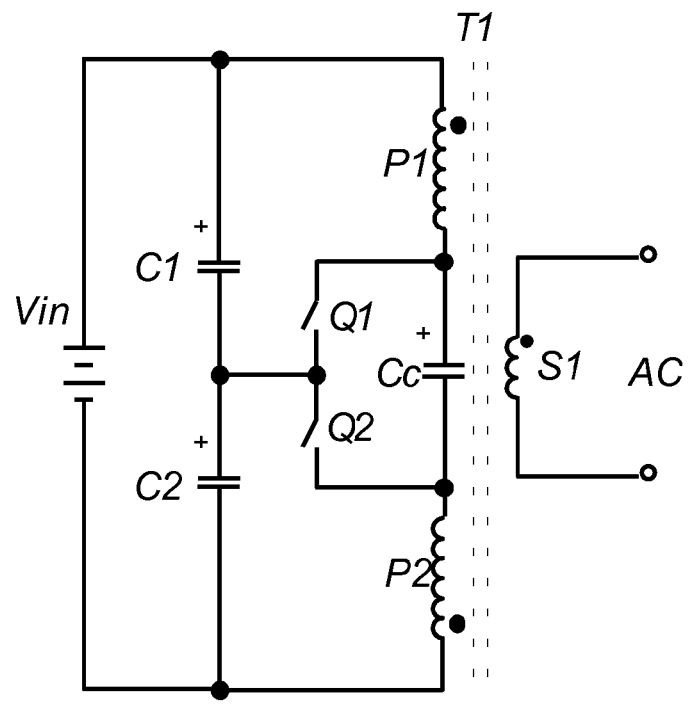
FIG. 2 is a circuit diagram of a DC-AC inversion circuit according to a first embodiment of the present invention.

To achieve the foregoing objectives, a power converter is used to convert DC voltage Vin received at a DC input to AC voltage as illustrated in FIG. 2. It comprises three series-connected sub-circuits formed by one transformer T1, two switches Q1 and Q2, two input capacitors C1 and C2, and one clamping capacitor Cc. The transformer T1 has at least one pair of primary windings P1 and P2 having identical turns and at least one secondary winding S1.

The first series sub-circuit is connected in parallel with the DC input voltage Vin and comprises two input capacitors C1 and C2 connected in series.

The secondary series sub-circuit is connected in parallel with the DC input voltage Vin and comprises the first primary winding P1, the clamping capacitor Cc and the secondary primary winding P2 series-connected in sequence. The dot terminals of the first and second primary windings P1 and P2 are connected to the positive and the negative terminals of the DC input voltage Vin, respectively. The two terminals of the clamping capacitor Cc are connected to the non-dot terminals of the first primary and second primary windings P1 and P2, respectively.

The third series sub-circuit connected in parallel with the clamping capacitor Cc and comprises the two switches Q1 and Q2 connected in series.

The center nodes of the series-connected capacitors C1 and C2 and the series connected switches Q1 and Q2 are connected together.

Two alternate driver signals are issued to turn on or turn off the switch Q1 or Q2 within one switching cycle. Consequently, an AC output voltage is generated in the secondary winding S1. After being rectified and filtered (not shown), the output of the power converter provides the DC output voltage to a load.

Figure 3:
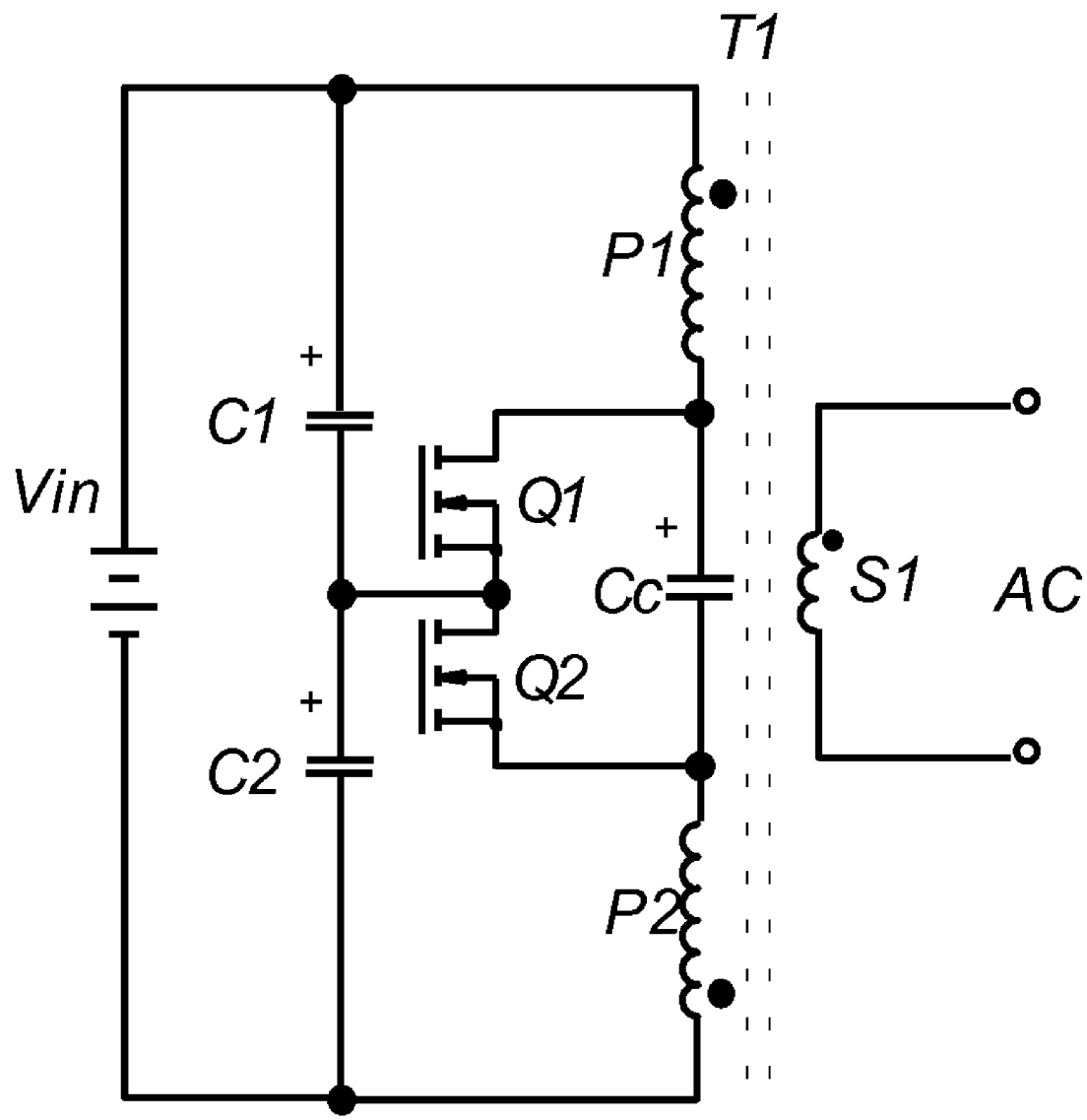
FIG. 3 is a circuit diagram showing an example of the DC-AC inversion circuit in FIG. 2, wherein the switches are implemented by MOSFETs.
Figure 4:
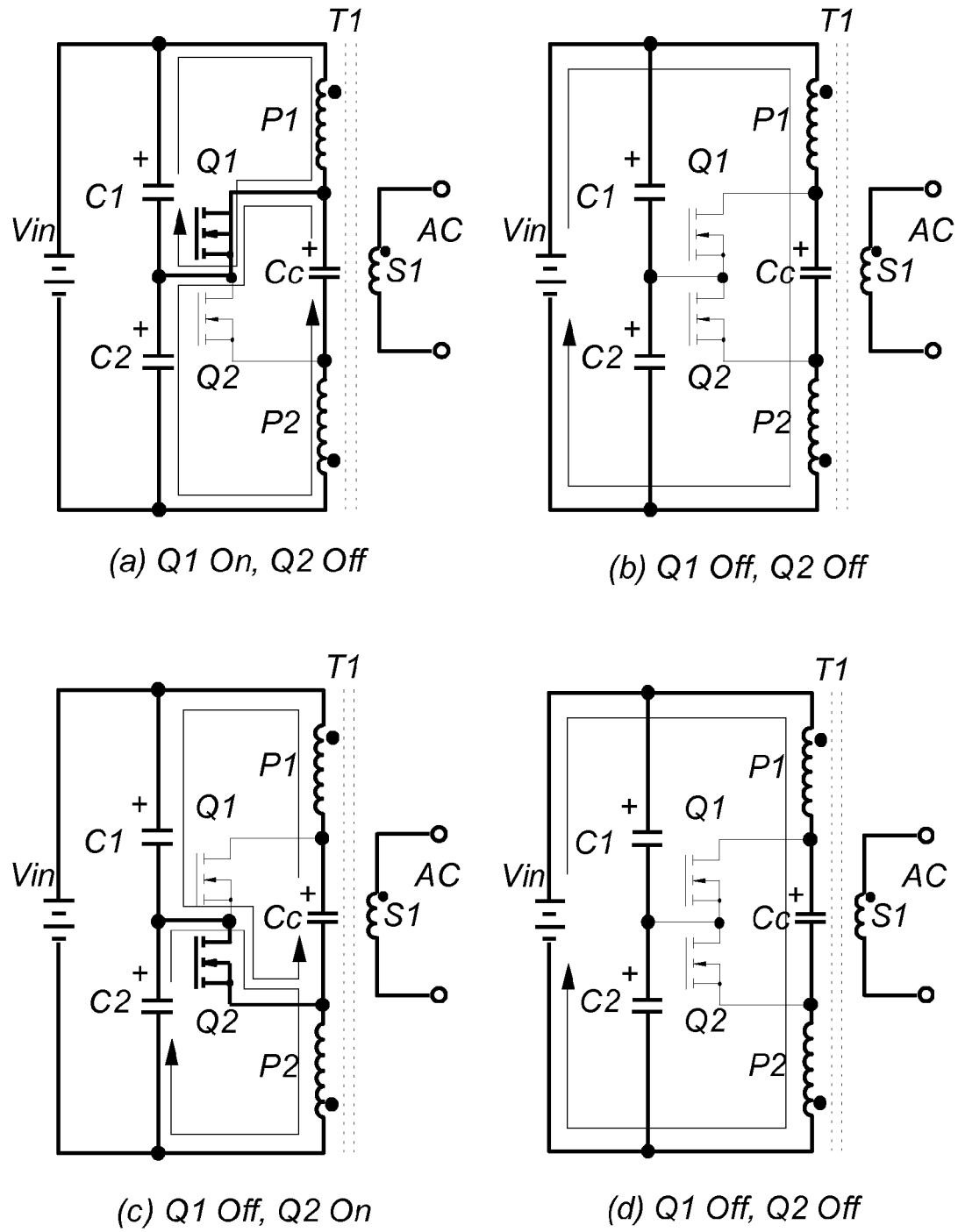
FIG. 4 shows an equivalent circuit of the DC-AC inversion circuit in FIG. 3 when the switches are turned on and turned off, respectively.

In accordance with the present invention, one embodiment of the power converter and its operating stages are illustrated as shown in FIG. 3 and FIG. 4, respectively. As an application example, MOSFETs Q1 and Q2 shown in FIG. 3 and FIG. 4 are used to be the switches Q1 and Q2 shown in FIG. 2. When it is assumed that input capacitors C1 and C2 are identical, the voltages across the input capacitors C1 and C2 are in equal voltage, i.e. ½ DC input voltage Vin. Thus, as shown in FIG. 4(a) to FIG. 4(d), there are four operation stages within one switching cycle during steady-state operation.

As shown in FIG. 4(a), gate drive signal is issued to turn on the first MOSFET Q1 in a first time interval. In addition to the voltage across the first input capacitor (i.e. ½ DC input voltage Vin) applied to the first primary winding P1, ½ DC input voltage Vin is also applied to the second primary winding P2 from the clamping capacitor Cc sequentially via a positive terminal of the clamping capacitor Cc, the first MOSFET Q1, the second input capacitor C2, the second primary winding P2 and a negative terminal of the clamping capacitor Cc. The first input capacitor C1 and clamping capacitor Cc are discharged while the capacitor C2 is charged during the first time interval.

As shown in FIG. 4(b), the gate drive signal is issued to turn off the first MOSFET Q1 in a second time interval. The clamping capacitor Cc is charged by the input voltage Vin and the energy stored in the leakage inductance of the transformer T1. Due to the opposite polarities of the two primary windings P1 and P2, the voltages across the first and second primary windings P1 and P2 are cancelled each other and the voltage of the clamping capacitor Cc is equal to the input voltage Vin. Since the leakage energy is absorbed, therefore, the voltage waveform of the first MOSFET Q1 has no voltage spike and its voltage stress is limited to the input voltage Vin.

As shown in FIG. 4(c), gate drive signal is issued to turn on the second MOSFET Q2 in a third time interval. In addition to the voltage of the second input capacitor C2 (i.e. ½ DC input voltage Vin) applied to the second primary winding P2, ½ DC input voltage Vin is also applied to the first primary winding P1 from the clamping capacitor Cc sequentially via the positive terminal of the clamping capacitor Cc, the first primary winding P1, the first input capacitor C1, the second MOSFET Q2 and the negative terminal of the clamping capacitor Cc. The second input capacitor C2 and clamping capacitor Cc are discharged while the first input capacitor C1 is charged instead during the third time interval.

As shown in FIG. 4(d), the gate drive signal is issued to turn off the second MOSFET Q2. The clamping capacitor Cc is charged by the input voltage Vin and the energy stored in the leakage inductance of the transformer T1. Due to the opposite polarities of the two primary windings P1 and P2, the voltages across the first and second primary windings P1 and P2 are cancelled each other and the voltage of the clamping capacitor Cc is equal to the input voltage Vin. Since leakage energy is absorbed, therefore, the voltage waveform of the second MOSFET Q2 has no voltage spike and its voltage stress is limited to the input voltage Vin.

Figure 5:
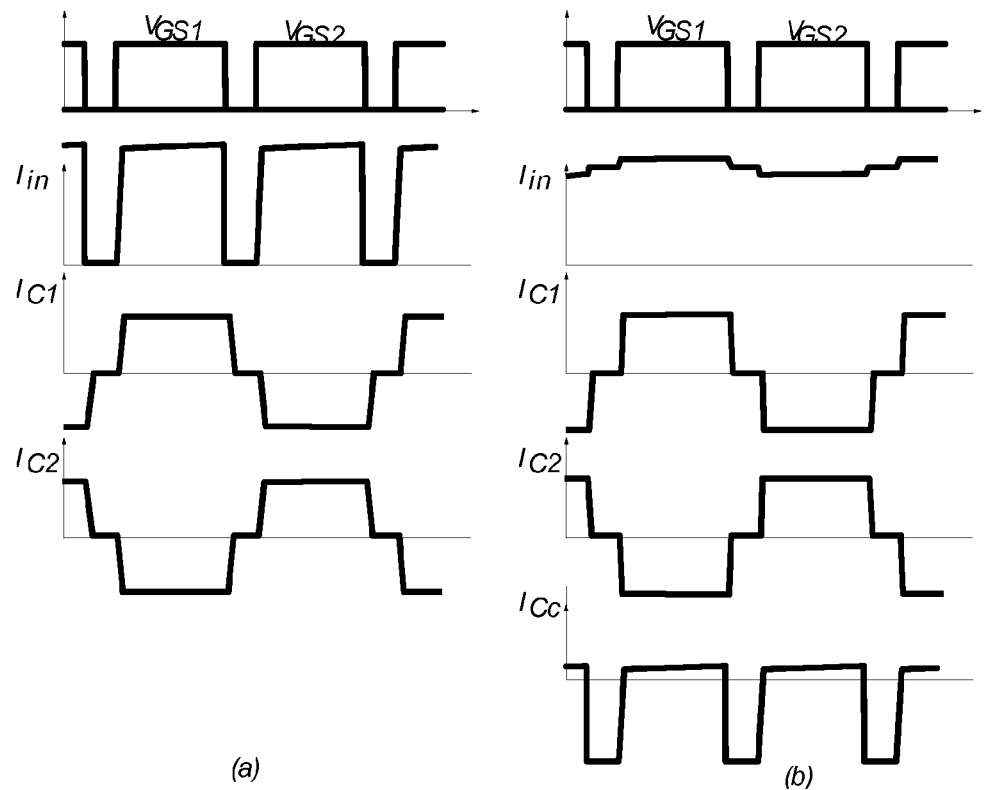
FIG. 5(a) and FIG. 5(b) are several key current waveforms of the half-bridge converter in the prior art and the topology of the present invention, respectively.

As shown in FIG. 5(a) and FIG. 5(b), several key current waveforms of the half-bridge converter in the prior art and the topology of the present invention are illustrated for performance comparison, respectively. As shown in FIG. 5(b), ripple of input current Iin of the present invention is significantly reduced due to the help of the clamping capacitor Cc. As a result, the number of the required input capacitor can be minimized.

As an enhancement of the embodiment, switches installed in the converter of the present invention may be other active semiconductor switches other than the first and second MOSFETs Q1 and Q2 mentioned above.

Figure 6:
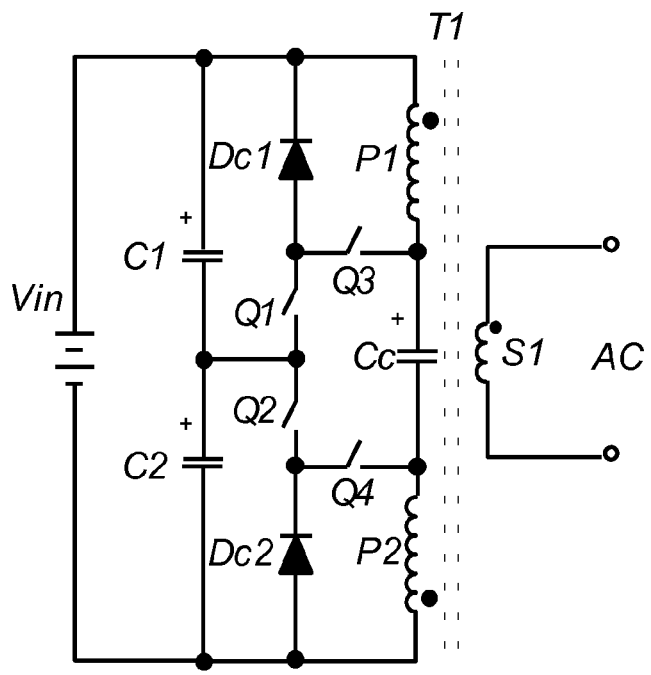
FIG. 6 is a circuit diagram of the DC-AC inversion circuit according to a second embodiment of the present invention.

As illustrated in FIG. 6 is a second embodiment according to the present invention. As shown, the two switches Q1 and Q2 in FIG. 2 are replaced with a first switch-pair Q1-Q3 and a second switch-pair Q2-Q4, respectively. To assure the voltage sharing between the first MOSFET Q1 and the third MOSFET Q3 connected in series as well as the second MOSFET Q2 and the fourth MOSFET Q4 connected in series, two clamping diodes Dc1 and Dc2 are thus added, respectively. Consequently, lower voltage rating MOSFET can be used resulting in reducing the conduction loss and improving the converter efficiency. Only the third series sub-circuit with the associated operations is different from that of its predecessor, therefore, the complementary descriptions will be given below.

The third series sub-circuit is connected in parallel with the clamping capacitor Cc and including two switch-pairs Q1-Q3 and Q2-Q4 connected in series. The first clamping diode Dc1 is connected between the positive terminal of the DC input voltage Vin and the center node of the first switch-pair Q1-Q3, and the second clamping diode Dc2 is connected between the center node of the second switch-pair Q2-Q4 and the negative terminal of the DC input voltage Vin. A center node of the first input capacitor C1 and the second input capacitor C2 is connected to a center node of the first switch Q1 and the second switch Q2.

Two pairs of the alternate driver signals are issued to turn on or turn off Q1-Q3 and Q2-Q4 switch-pairs within one switching cycle. Due to the alternative turning on of the clamping diode Dc1 or Dc2, the switches Q1 and Q3 or Q2 and Q4 are clamped to ½ Vin, respectively.

Consequently, an AC output voltage is generated in a secondary winding S1. After being rectified and filtered (not shown), the power converter provides the DC output voltage to a load.

Figure 7:
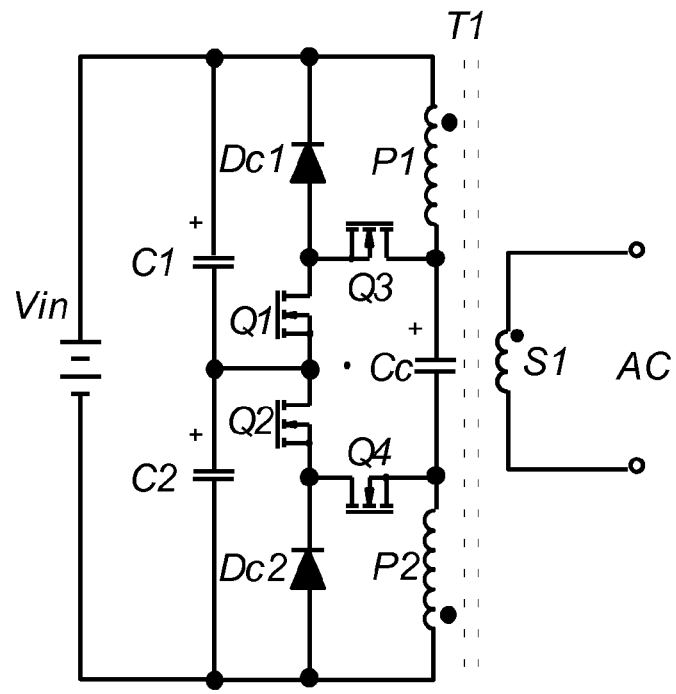
FIG. 7 is a circuit diagram showing an example of the DC-AC inversion circuit in FIG. 6, wherein the switches are implemented by MOSFETs.

Again, as an enhancement of the embodiment, the switches Q1, Q2, Q3 and Q4 may be other active semiconductor switches other than MOSFETs Q1, Q2, Q3 and Q4 shown in FIG. 7.

The two embodiments of the present invention may be extended its function from an inversion circuit to a rectifier circuit and will be described below.

Figure 8:
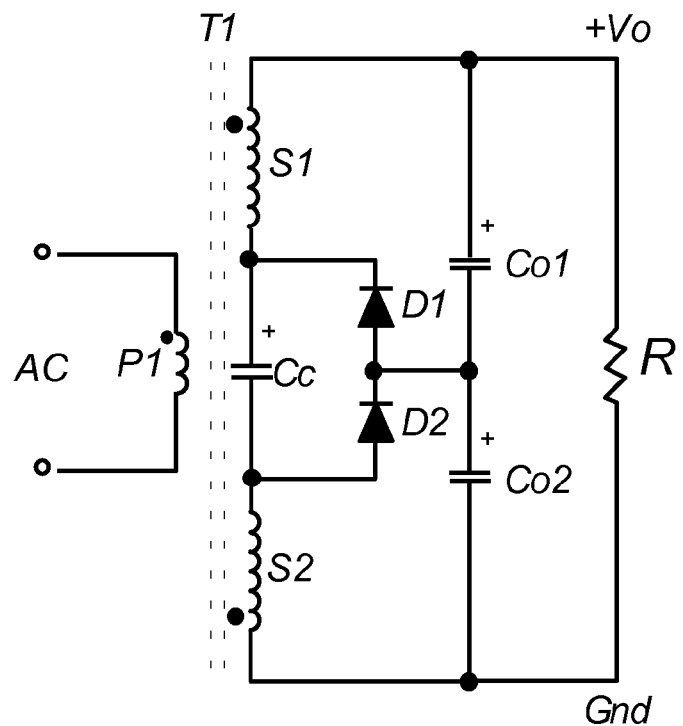
FIG. 8 is a circuit diagram of an AC-DC rectification circuit according to a third embodiment of the present invention.

A third embodiment of the present invention is shown in FIG. 8. It is used to convert AC voltage received at a primary winding P1 of a transformer T1 to DC voltage Vo at a DC output and comprises three series-connected sub-circuits formed by one transformer T1, two diodes (as the rectifiers) D1 and D2, two output capacitors Co1 and Co2, and one clamping capacitor Cc. The transformer T1 has at least one primary winding P1 and at least one pair of secondary windings S1 and S2 having identical turns.

The first series sub-circuit comprises two output capacitors Co1 and Co2 connected in series. Across the first series sub-circuit, a DC output voltage Vo is produced to provide a load R.

The secondary series sub-circuit is connected in parallel with the DC output voltage Vo and comprises the first secondary winding S1, the clamping capacitor Cc and the second secondary winding S2 sequentially connected in series. The dot terminals of the first second winding S1 and the second secondary winding S2 are connected to the positive and the negative terminals of the DC output voltage Vo, respectively. The first and the second terminals of the clamping capacitor Cc are connected to the non-dot terminals of the first secondary winding S1 and the second secondary winding S2, respectively.

The third series sub-circuit connected in parallel with the clamping capacitor Cc and comprises two diodes D1 and D2 connected in series.

The center nodes of the series-connected output capacitors Co1-Co2 and the series-connected diodes D1-D2 are connected together.

When it is assumed that the first and second output capacitors Co1 and Co2 are identical and the DC output voltage Vo is the sum of the voltages across the first and second output capacitors Co1 and Co2. The voltage produced by the primary winding P1 of the transformer T1 is coupled to the first and second secondary windings S1 and S2 to generate an AC voltage. Thus, as shown in FIG. 9(a) to FIG. 9(d), the diodes D1 and D2 are biased to be turned on and turned off alternatively. There are four operation stages within one switching cycle during steady-state operation.

Figure 9:
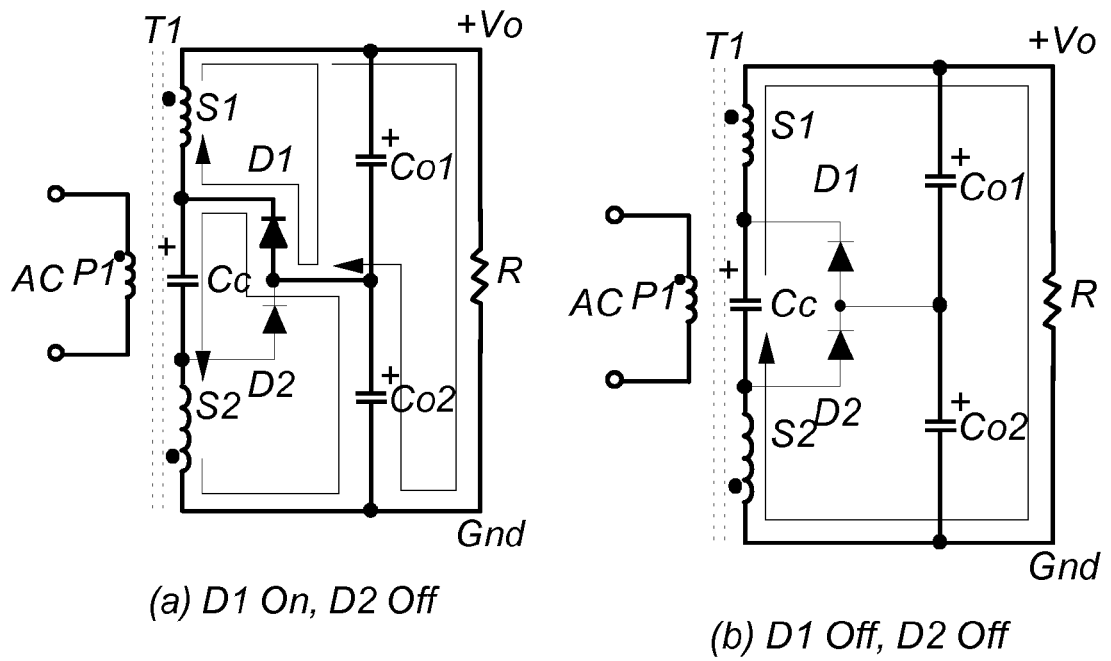
FIG. 9 shows an equivalent circuit of the AC-DC rectification circuit in FIG. 8 when the rectifiers are turned on and turned off, respectively.
Figure 9:
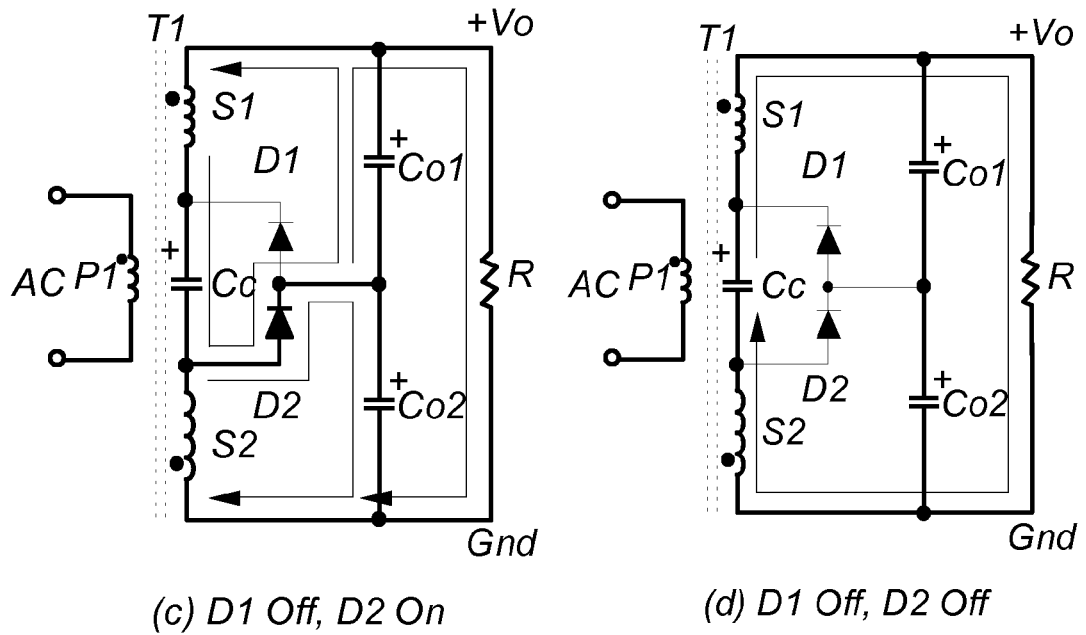

As shown in FIG. 9(a), the first diode D1 is turned on due to its forward-biased condition provided by the voltage of the first secondary winding S1 in a first time interval. The first secondary winding S1 couples the input AC voltage to charge the first output capacitor Co1 and the load R sequentially via the positive terminal of the first secondary winding S1, the first output capacitor Co1, the first diode D1 and the negative terminal of the first secondary winding S1 and sequentially via the positive terminal of the first secondary winding S1, the load R, the second output capacitor Co2, the first diode D1 and the negative terminal of the first secondary winding S1, respectively. On the other hand, the clamping capacitor Cc is charged by the second secondary winding S2 and the output capacitor Co2 sequentially via the positive terminal of the second secondary winding S2, the second output capacitor Co1, the first diode D1, the clamping capacitor Cc and the negative terminal of the second secondary winding S2. The first output capacitor Co1 and clamping capacitor Cc are charged while the second output capacitor Co2 is discharged during the first time interval.

As shown in FIG. 9(b), the first diode D1 is turned off due to its reverse-biased condition provided by the voltage of the first secondary winding S1 in a second time interval. The energies stored in the leakage inductance of the transformer T1 and the clamping capacitor Cc are used to provide the output current. Due to the opposite polarities of the two secondary windings S1 and S2, the voltages across the first and second secondary windings S1 and S2 are cancelled each other and the voltage of the clamping capacitor Cc is used to provide the output load current. Since leakage energy is absorbed, therefore, the voltage waveform of the first diode D1 has no voltage spike and its voltage stress is limited to the output voltage Vo. Moreover, due to the help of the clamping capacitor Cc, the output current ripple is reduced resulting in minimizing the number of the required output capacitor.

As shown in FIG. 9(c), the second diode D2 is turned on due to its forward-biased condition provided by the voltage of the second secondary winding S2 in a third time interval. The second secondary winding S2 couples the input AC voltage to charge the second output capacitor Co2 and the load R sequentially via the positive terminal of the second secondary winding S2, the second diode D2, the second output capacitor Co2 and the negative terminal of the second secondary winding S2 and sequentially via the positive terminal of the second secondary winding S2, the second diode D2, the first output capacitor Co1, the load R and the negative terminal of the second secondary winding S2, respectively. On the other hand, the clamping capacitor Cc is charged by the first secondary winding S1 and the output capacitor Co1 sequentially via the positive terminal of the first secondary winding S1, the clamping capacitor Cc, the second diode D2, the first output capacitor Co1 and the negative terminal of the first secondary winding S1. The second capacitor Co2 and clamping capacitor Cc are charged while the first capacitor Co1 is discharged during the third time interval.

As shown in FIG. 8(d), the second diode D2 is turned off due to its reverse-biased condition provided by the voltage of the second secondary winding S2 in a fourth time interval. The energies stored in the leakage inductance of the transformer T1 and the clamping capacitor Cc are discharged to provide the output current. Due to the opposite polarities of the two secondary windings S1 and S2, the voltages across the first and second secondary windings S1 and S2 are cancelled each other and the voltage of the clamping capacitor Cc is used to provide the output load current. Since leakage energy is absorbed, therefore, the voltage waveform of the second diode D2 has no voltage spike and its voltage stress is limited to the output voltage Vo. Moreover, due to the help of the clamping capacitor Cc, the output current ripple is reduced resulting in minimizing the number of the required output capacitor.

Figure 10:
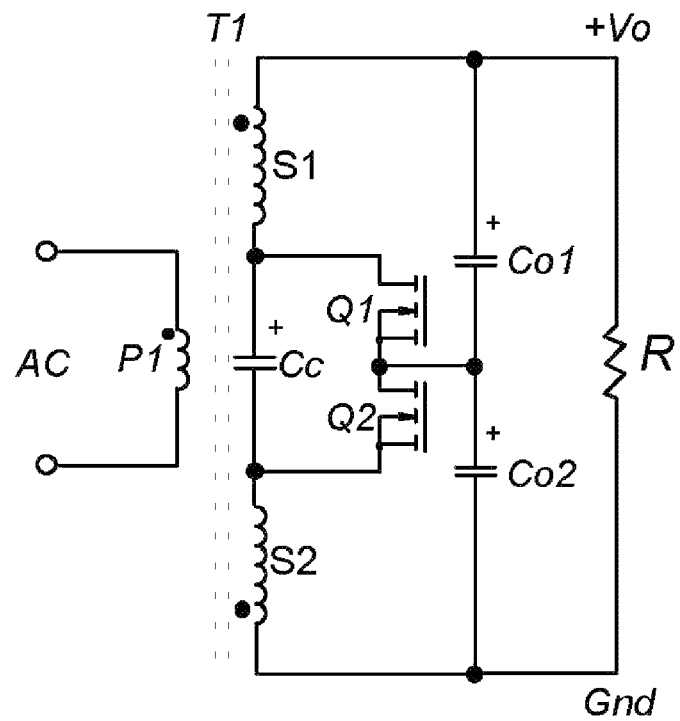
FIG. 10 is a circuit diagram showing an example of the AC-DC rectification circuit in FIG. 8, wherein the rectifiers are implemented by MOSFETs.

In the embodiment of FIG. 8, the first and second diodes D1 and D2 are used as rectifiers. However, as an enhancement of the embodiment to improve the efficiency, the rectifiers may be, for example, synchronous rectifiers Q1 and Q2 as shown in FIG. 10 or a combination of one diode and one synchronous rectifier.

Figure 11:
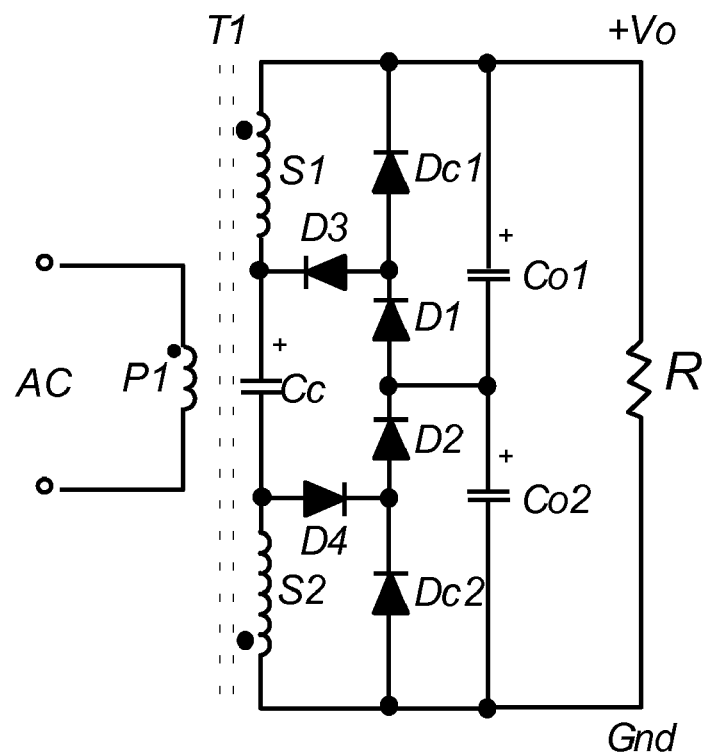
FIG. 11 is a circuit diagram of the AC-DC rectification circuit according to a fourth embodiment of the present invention.

As illustrated in FIG. 11 is the fourth embodiment according to the present invention. As shown, the rectifiers D1 and D2 in FIG. 8 are replaced with a first rectifier-pair D1-D3 and a second rectifier-pair D2-D4, respectively. To assure the voltage sharing between the first rectifier D1 and the third rectifier D3, two clamping diodes Dc1 and DC2 are thus added, respectively. Consequently, lower voltage rating rectifier can be used resulting in reducing the conduction loss and improving the converter efficiency. Only the third series sub-circuit with the associated operations is different from that of its predecessor, therefore, the complementary descriptions will be given below.

The third series sub-circuit is connected in parallel with the clamping capacitor Cc and including two series-connected rectifier-pairs D1-D3 and D2-D4 connected in series. The first clamping diode Dc1 is connected between the positive terminal of the DC output voltage Vo and the center node of the first rectifier-pair D1-D3, and the second clamping diode Dc2 is connected between the center node of the second rectifier-pair D2-D4 and the negative terminal of the DC output voltage Vo.

Due to the alternative turning on of the clamping diode Dc1 or Dc2, the rectifiers D1 and D3 or D2 and D4 are clamped to ½ Vo, respectively.

The center node of the first output capacitor Co1 and the second output capacitor Co2 is connected to the center node of the first rectifier D1 and the second rectifier D2.

Figure 12:
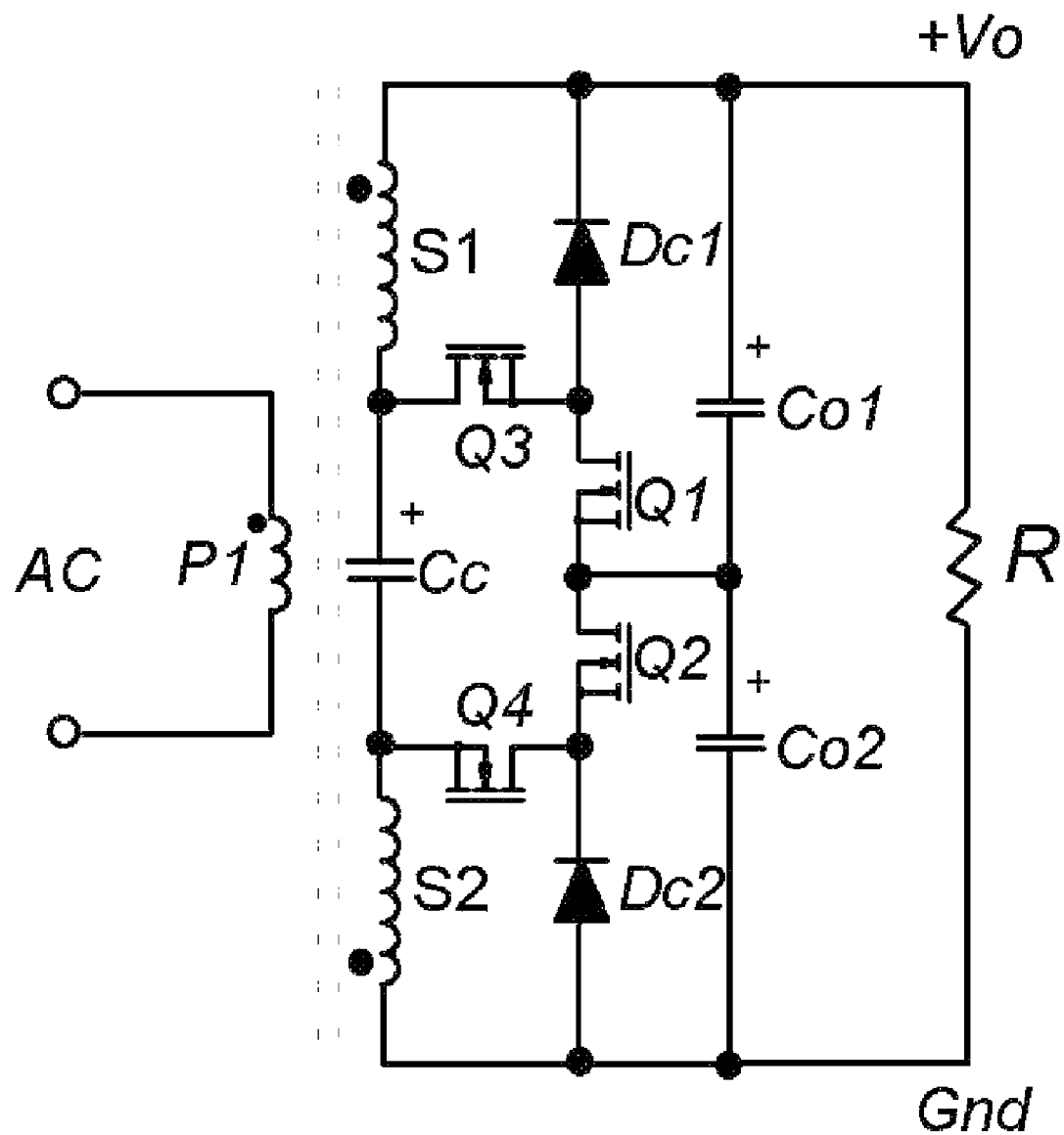
FIG. 12 is a circuit diagram showing an example of the AC-DC rectification circuit in FIG. 11, wherein the rectifiers are implemented by MOSFETs.

In the embodiment of FIG. 11, diodes D1, D2, D3 and D4 are used as rectifiers. However, as an enhancement of the embodiment to improve the efficiency, the rectifiers may be, for example, synchronous rectifiers Q1, Q2, Q3 and Q4, as shown in FIG. 12 or a combination of the diode and synchronous rectifier.

In the embodiments shown herein switching functions can be performed by any suitable devices known in the art, or later developed. In the preferred embodiments, field-effect transistors are used, however the invention may also use other appropriate switch devices such as bipolar transistors, IGBTs, or even electromechanical switch.

Although the embodiments of the present invention are disclosed to be key part of the power converters. However, it can be combined with topologies of the prior art. For instance, the rectification by the embodiment of the present invention and the inversion may be performed by a topology of the prior art, or vise versa. Furthermore, both the inversion and rectification can be performed by the techniques disclosed herein.

While the invention has been described in detail herein, in accordance with certain preferred embodiments, thereof, many modifications and changes thereto may be affected by those skilled in the art. Accordingly, it is intended by the appended claims to cover all such modifications and changes as fall within the true spirit and scope of the invention.

What is claimed is:

1. A circuit to convert DC voltage received at a DC input to AC voltage, said circuit comprising:
   a transformer including a first primary winding, a second primary winding and at least one secondary winding, wherein said secondary winding is magnetically coupled to said first and second primary windings and provides AC voltage;
   a first series sub-circuit connected in parallel with said DC input and including a first capacitor and a second capacitor connected in series;
   a second series sub-circuit connected in parallel with said DC input and including said first primary winding, a clamping capacitor and said second primary winding sequentially connected in series;
   a third series sub-circuit connected in parallel with said clamping capacitor including a first switch and a second switch connected in series; and
   a center node of said first capacitor and said second capacitor within said first series sub-circuit and a center node of said first switch and said second switch within said third series sub-circuit are connected together.

2. The circuit of claim 1, wherein said switch is a MOSFET, or any other active semiconductor switch, or an electromechanical switch.

3. A circuit to convert DC voltage received at a DC input to AC voltage, said circuit comprising:
   a transformer including a first primary winding, a second primary winding and at least one secondary winding, wherein said secondary winding is magnetically coupled to said first and second primary windings and provides AC voltage;
   a first series sub-circuit connected in parallel with said DC input and including a first capacitor and a second capacitor connected in series;
   a second series sub-circuit connected in parallel with said DC input and including said first primary winding, a clamping capacitor and said second primary winding sequentially connected in series;
   a first switch-pair comprising two switches connected in series;
   a second switch-pair comprising two switches connected in series;
   a third series sub-circuit connected in parallel with said clamping capacitor including said first switch-pair and said second switch-pair connected in series;
   a first diode connected between a positive node of said DC input and a center node of said first switch-pair;
   a second diode connected between a center node of said second switch-pair and a negative node of said DC input; and
   a center node of said first capacitor and said second capacitor within said first series sub-circuit and a center node of said first switch-pair and said second switch-pair within said third series sub-circuit are connected together.

4. The circuit of claim 3, wherein said switch is a MOSFET, or any other active semiconductor switch, or an electromechanical switch.

5. A circuit to convert AC voltage to DC voltage at a DC output, said circuit comprising:
   a transformer including at least one primary winding for receiving AC voltage and at least one secondary winding-pair including a first secondary winding and a second secondary winding, wherein said primary winding is magnetically coupled to said first and second secondary windings;
   a first series sub-circuit including a first capacitor and a second capacitor connected in series;
   a second series sub-circuit including said first secondary winding, a clamping capacitor and said second secondary winding sequentially connected in series;
   a third series sub-circuit connected in parallel with said clamping capacitor and including a first rectifier and a second rectifier connected in series; and
   a center node of said first capacitor and said second capacitor within said first series sub-circuit and a center node of said first rectifier and said second rectifier within said third series sub-circuit are connected together;
   thereby DC voltage is produced across said first series sub-circuit and said third series sub-circuit.

6. The circuit of claim 5, wherein said rectifier is a diode, a MOSFET or any other active semiconductor switch.

7. A circuit to convert AC voltage to DC voltage at a DC output, said circuit comprising:
   a transformer including at least one primary winding for receiving AC voltage and at least one secondary winding-pair including a first secondary winding and a second secondary winding, wherein said primary winding is magnetically coupled to said first and second secondary windings;
   a first series sub-circuit connected in parallel with said DC output and including a first capacitor and a second capacitor connected in series;
   a second series sub-circuit connected in parallel with said DC output and including said first secondary winding, a clamping capacitor and said second secondary winding sequentially connected in series;
   a first rectifier-pair comprising two rectifiers connected in series;
   a second rectifier-pair comprising two rectifiers connected in series;
   a third series sub-circuit, connected in parallel with said clamping capacitor and including said first rectifier-pair and said second rectifier-pair connected in series;
   a first diode connected between a positive node of said DC output and a center node of said first rectifier-pair;
   a second diode connected between a center node of said second rectifier-pair and a negative node of said DC output; and
   a center node of said first capacitor and said second capacitor within said first series sub-circuit and a center node of said first rectifier-pair and said second rectifier-pair within said third series sub-circuit are connected together;
   thereby DC voltage is produced across said first series sub-circuit and said third series sub-circuit.

8. The circuit of claim 7, wherein said rectifier is a diode, a MOSFET or any other active semiconductor switch.

* * * * *